(12) United States Patent
Zhang et al.

(10) Patent No.: US 10,135,102 B2
(45) Date of Patent: Nov. 20, 2018

(54) BATTERY MANAGEMENT SYSTEM FOR ELECTRIC AUTOMOBILE AND CONTROL METHOD THEREOF

(71) Applicants: SHENZHEN ESPIRIT TECHNOLOGY CO., LTD., Shenzhen, Guangdong (CN); BEIJING HAIKE ZHIDONG TECHNOLOGY DEVELOPMENT CO., LTD., Beijing (CN); Jiefu Zhang, Shenzhen, Guangdong (CN)

(72) Inventors: Jiefu Zhang, Guandong (CN); Tianxiang Guo, Guandong (CN)

(73) Assignees: SHENZHEN ESPIRIT TECHNOLOGY CO., LTD., Shenzhen (CN); BEIJING HAIKE ZHIDONG TECHNOLOGY DEVELOPI, Beijing (CN)

( * ) Notice: Subject to any disclaimer, the term of this patent is extended or adjusted under 35 U.S.C. 154(b) by 257 days.

(21) Appl. No.: 15/107,922

(22) PCT Filed: Dec. 25, 2013

(86) PCT No.: PCT/CN2013/090432
§ 371 (c)(1),
(2) Date: Jun. 24, 2016

(87) PCT Pub. No.: WO2015/096066
PCT Pub. Date: Jul. 2, 2015

(65) Prior Publication Data
US 2016/0315362 A1    Oct. 27, 2016

(51) Int. Cl.
*H01M 10/63* (2014.01)
*H01M 10/625* (2014.01)
(Continued)

(52) U.S. Cl.
CPC ......... *H01M 10/63* (2015.04); *H01M 2/1235* (2013.01); *H01M 10/486* (2013.01);
(Continued)

(58) Field of Classification Search
CPC ............................ F28D 15/04; B60L 11/1851
See application file for complete search history.

(56) References Cited

U.S. PATENT DOCUMENTS

2004/0137313 A1* 7/2004 Jaura ...................... H01M 10/63
429/62
2009/0321532 A1* 12/2009 Maitre ............... B60H 1/00278
236/91 R
(Continued)

FOREIGN PATENT DOCUMENTS

CN        202076386 U  * 12/2011
CN        103094640 A  *  5/2013

*Primary Examiner* — Abdullah Riyami
*Assistant Examiner* — Nader Alhawamdeh
(74) *Attorney, Agent, or Firm* — Chieh-Mei Wang

(57) ABSTRACT

A battery management system for an electric automobile and a control method are provided. The battery management system includes a temperature monitoring device (10) connected to a battery compartment of the electric automobile for monitoring the battery temperature and transmitting the battery temperature to a main control device (12), a refrigeration circulation channel (11) connected to the battery compartment for circulating a refrigerant so as to refrigerate the batteries. The main control device is connected to an acquisition device and the refrigeration circulation channel, for controlling the refrigerant to be circulated so as to refrigerate the batteries when the battery temperature exceeds a preset upper limit value. With the battery management and the control method, the impact of the high temperature on the service life and the capacity and the like of the batteries can be reduced, and the service life of the batteries can be prolonged.

17 Claims, 12 Drawing Sheets

(51) Int. Cl.
  *H01M 10/6568* (2014.01)
  *H01M 10/613* (2014.01)
  *H01M 10/48* (2006.01)
  *H01M 10/615* (2014.01)
  *H01M 2/12* (2006.01)
  *H01M 10/42* (2006.01)

(52) U.S. Cl.
  CPC ....... *H01M 10/613* (2015.04); *H01M 10/615* (2015.04); *H01M 10/625* (2015.04); *H01M 10/6568* (2015.04); H01M 2010/4278 (2013.01); H01M 2200/00 (2013.01); H01M 2200/10 (2013.01); H01M 2220/20 (2013.01)

(56) References Cited

U.S. PATENT DOCUMENTS

| | | | |
|---|---|---|---|
| 2010/0009246 A1* | 1/2010 | Maitre | H01M 10/625 429/62 |
| 2011/0000241 A1* | 1/2011 | Favaretto | B60K 11/02 62/244 |
| 2011/0072841 A1* | 3/2011 | Arai | B60H 1/00278 62/259.2 |
| 2012/0003515 A1* | 1/2012 | Eisenhour | H01M 10/625 429/62 |
| 2013/0111932 A1* | 5/2013 | Mishima | F25B 29/00 62/79 |
| 2014/0023897 A1* | 1/2014 | Suga | H01M 10/48 429/90 |
| 2016/0315362 A1* | 10/2016 | Zhang | H01M 10/486 |

* cited by examiner

The capacity of new batteries is substantially consistent

The capacity is different after being used for a period of time

The capacity is recovered to be substantially consistent after being automatically equalized by the system

BATTERY MANAGEMENT SYSTEM FOR ELECTRIC AUTOMOBILE AND CONTROL METHOD THEREOF

BACKGROUND OF THE INVENTION

1. Field of the Invention

The present invention generally relates to battery management technology, and more specifically, relates to a battery management system for an electric automobile and a control method of the battery management system.

2. Description of Related Art

Pure electric automobiles are popularizing for the low pollution, low noise characteristics. The pure electric automobiles typically adopt lithium iron phosphate batteries as power batteries. High temperatures can affect capacity, service life and other properties of the lithium iron phosphate batteries. In case of the pure electric automobiles travelling for a long time or in case of hot weather, the power batteries of the pure electric automobiles are prone to the phenomenon of high temperature, which will cause the service life of the power batteries to be shortened and meanwhile produce the security risks.

SUMMARY OF THE INVENTION

Disclosure of the Invention

Technical Problem

A summary of the invention is described below, for providing a basic understanding about some aspects of the present invention. It should be understood, the summary is not an exhaustive overview of the present invention. The summary is not the intention to determine the critical or important part of the present invention, nor is it intended to limit the scope of the invention. The sole purpose of the summary is to present some concepts in a simplified form, which functions as a preamble of a more detailed description discussed later.

The present invention provides a battery management system and a control method of the battery management system, to solve the problem of high temperature on battery performance impact of a pure electric automobile.

Solutions to Problem

Technology Solutions

The present invention provides a battery management system for an electric automobile, comprising:

a temperature monitoring device connected to a battery compartment of the electric automobile, to monitor battery temperature in the battery compartment, and transmit the battery temperature to a main control device;

a refrigeration circulation channel connected to the battery compartment of the electric automobile, to circulate refrigerant thereby to refrigerate batteries in the battery compartment; and the main control device connected to the acquisition device and the refrigeration circulation channel, to control the refrigerant to circulate in the refrigeration circulation channel thereby to refrigerate the batteries in the battery compartment, in response to the battery temperature exceeding a preset upper limit value.

The present invention further provides a control method based on the above-mentioned battery management system for the electric automobile, and the control method comprises:

monitoring the battery temperature in the battery compartment, and transmitting the battery temperature to the main control device; and the main control device determining whether the battery temperature exceeds the preset upper limit value, if the battery temperature exceeds the preset upper limit value, the main control device controls the refrigerant to circulate in the refrigeration circulation channel to refrigerate the batteries in the battery compartment, until the temperature of the battery compartment drops below the preset upper limit value.

Advantages of the Invention

Advantages

The battery management system for the electric automobile of the present invention can monitor the battery temperature in the battery compartment through the temperature monitoring device. The main control device controls the refrigerant to circulate in the refrigeration circulation channel to refrigerate the batteries in the battery compartment when the battery temperature exceeds the preset upper limit value. Because the battery management system for the electric automobile of the present invention can timely refrigerate the batteries when the battery temperature exceeds the preset upper limit value, to reduce the battery temperature, the impact of high temperature to the service life, capacity, etc. of the batteries can be reduced, and the service life of the batteries can be improved.

DESCRIPTION OF THE DRAWINGS

Brief Description of the Drawings

Brief Description

To more clearly illustrate the embodiments of the present invention or the technical solutions of the prior art, a brief introduction about the accompanying drawings of the following embodiments or the prior art will be described. Obviously, the following drawings described below are only some embodiments of the present invention. To those of ordinary skill in the art, under the premise without creative efforts, other drawings based on these drawings can also be obtained.

Figure 1:
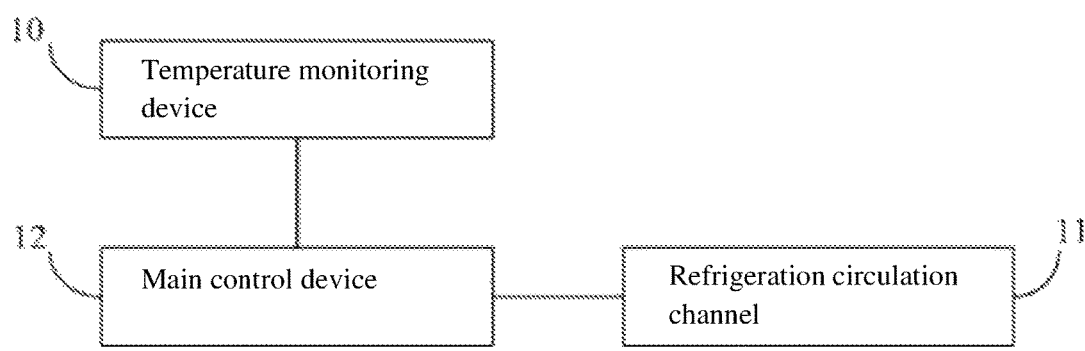

FIG. 1 is a block diagram of a battery management system for an electric automobile of a first embodiment of the present invention.

Figure 2:
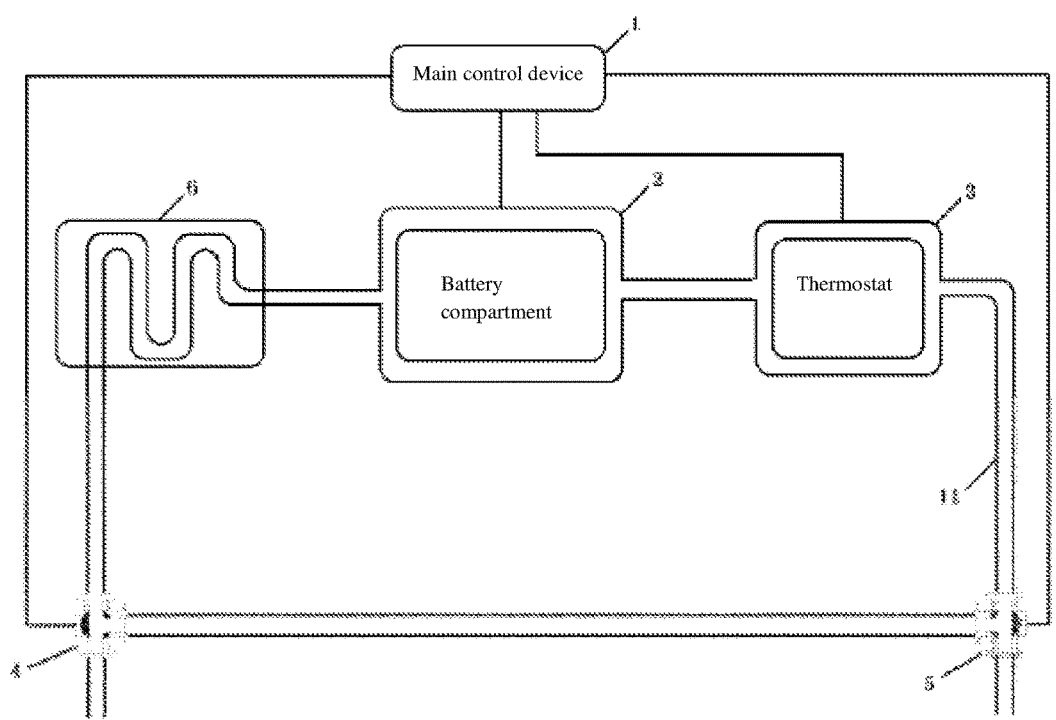

FIG. 2 is a connection schematic diagram of a main control device and a refrigeration circulation channel of the battery management system for the electric automobile.

Figure 3:
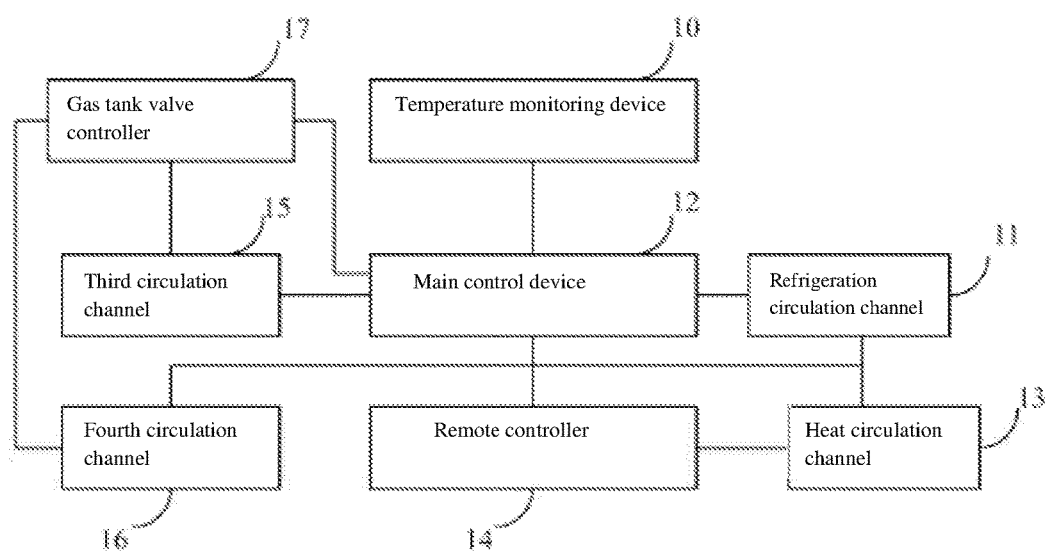

FIG. 3 is a block diagram of a battery management system for an electric automobile of a second embodiment of the present invention.

Figure 4:
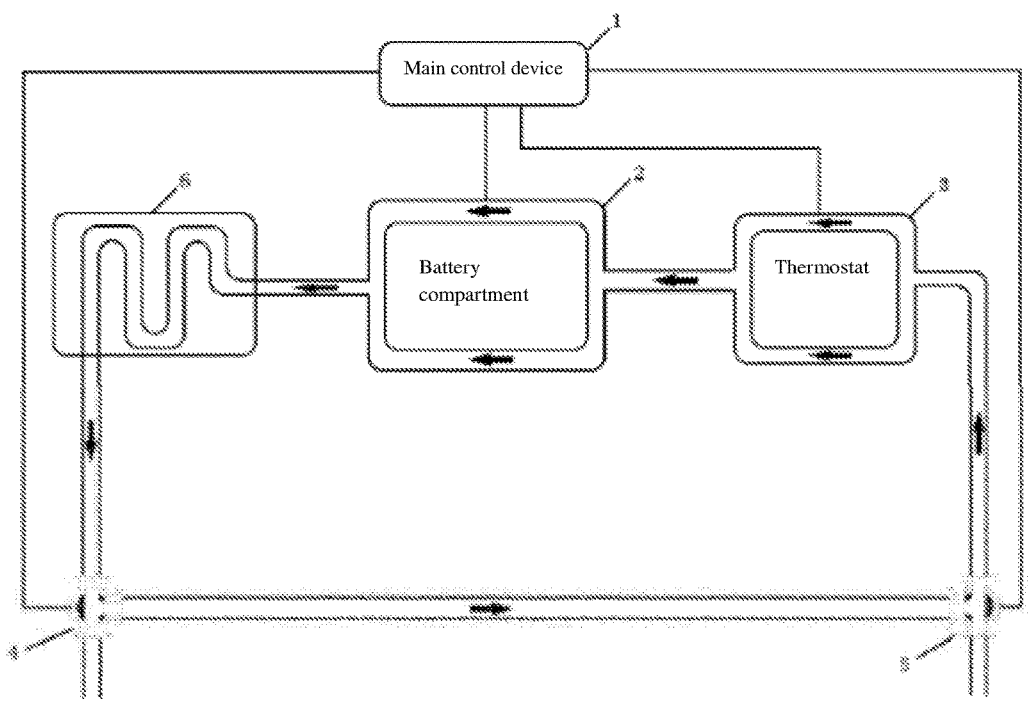

FIG. 4 is a schematic diagram of a battery management system for an electric automobile of a third embodiment of the present invention, which uses a liquid circulation mode to refrigerate batteries.

Figure 5:
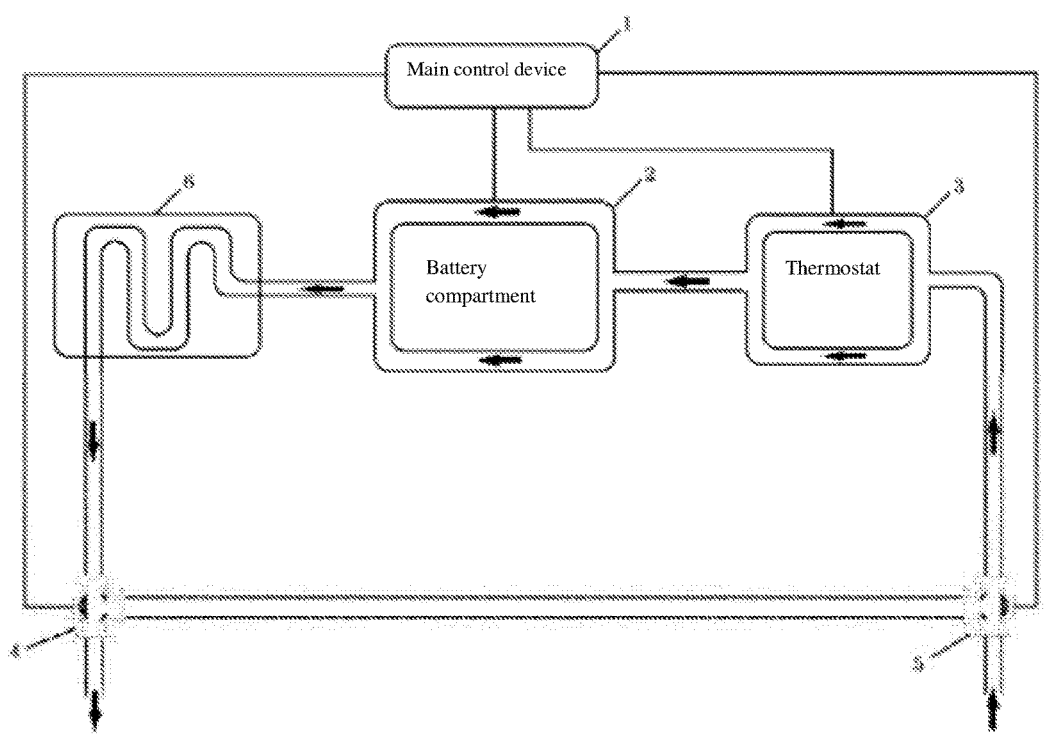

FIG. 5 is a schematic diagram of the battery management system for the electric automobile of the third embodiment of the present invention, which uses an air circulation mode to refrigerate the batteries.

Figure 6:
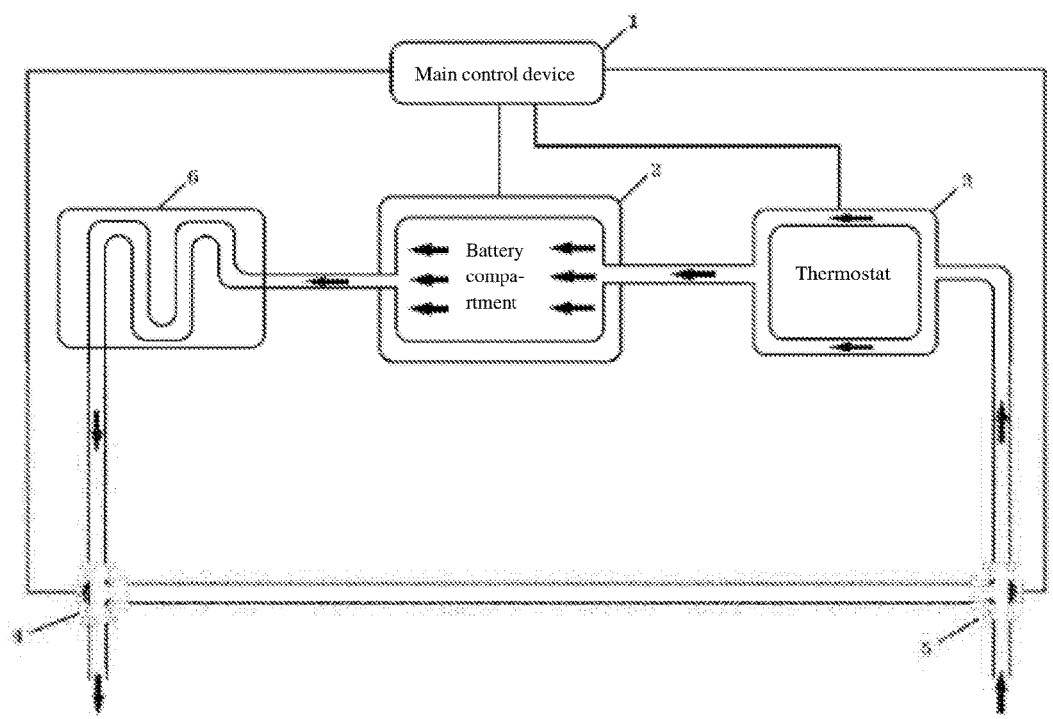

FIG. 6 is a schematic diagram of the battery management system for the electric automobile of the third embodiment of the present invention, which uses another air circulation mode to refrigerate the batteries.

Figure 7:
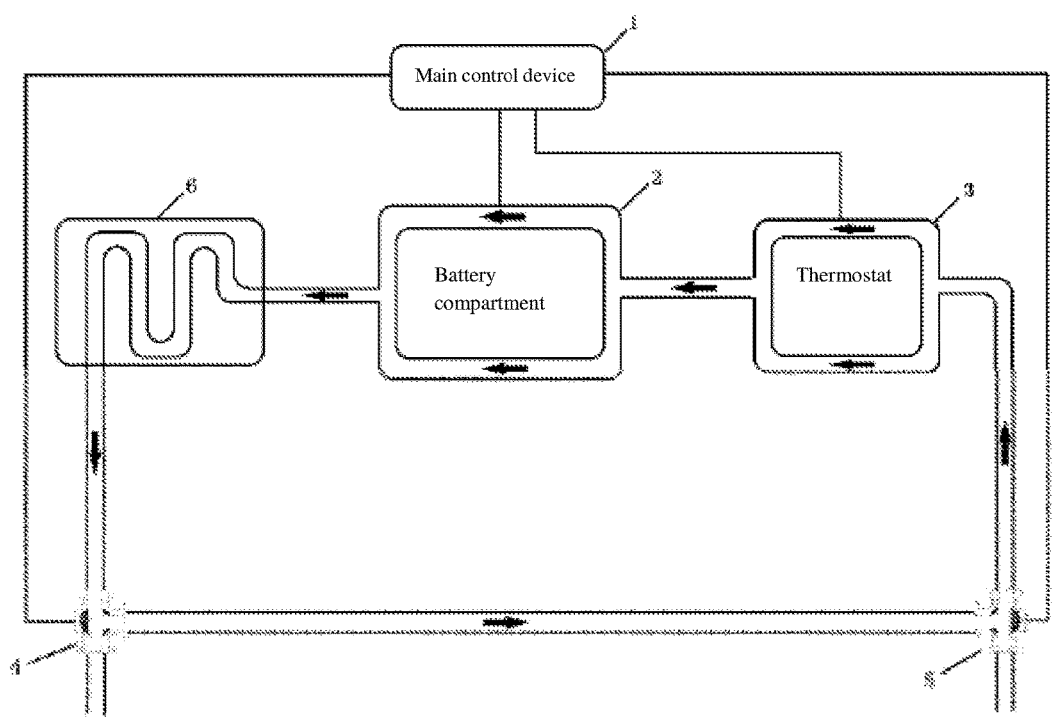

FIG. 7 is a schematic diagram of a battery management system for an electric automobile of a fourth embodiment of the present invention, which uses a liquid/air circulation mode to heat batteries.

Figure 8:
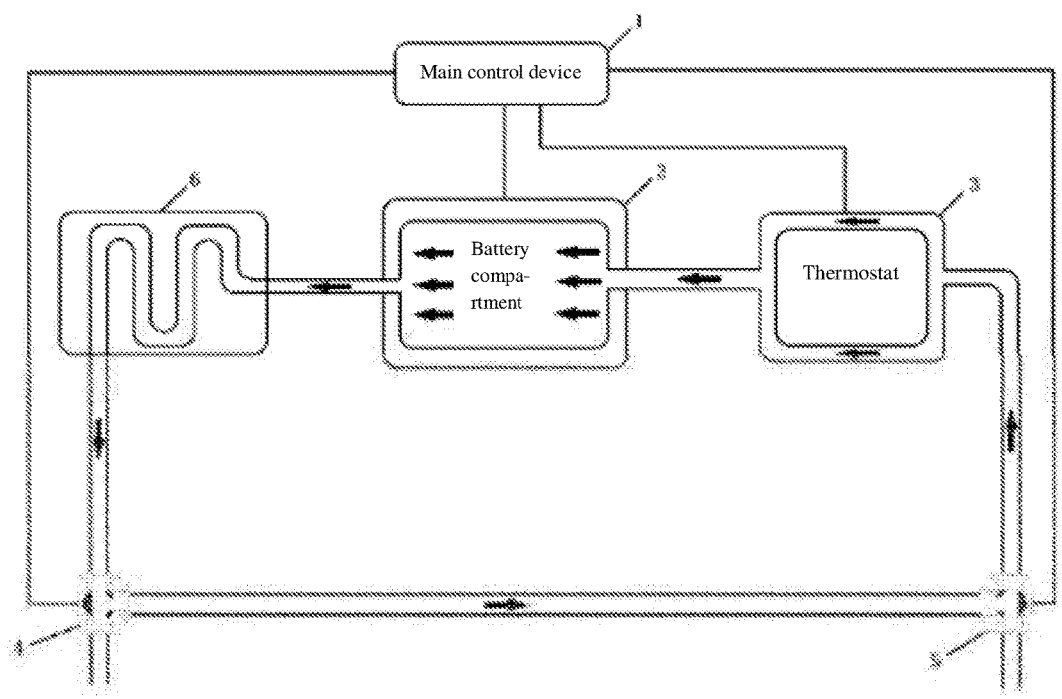

FIG. 8 is a schematic diagram of the battery management system for the electric automobile of the fourth embodiment of the present invention, which uses another air circulation mode to heat the batteries.

Figure 9:
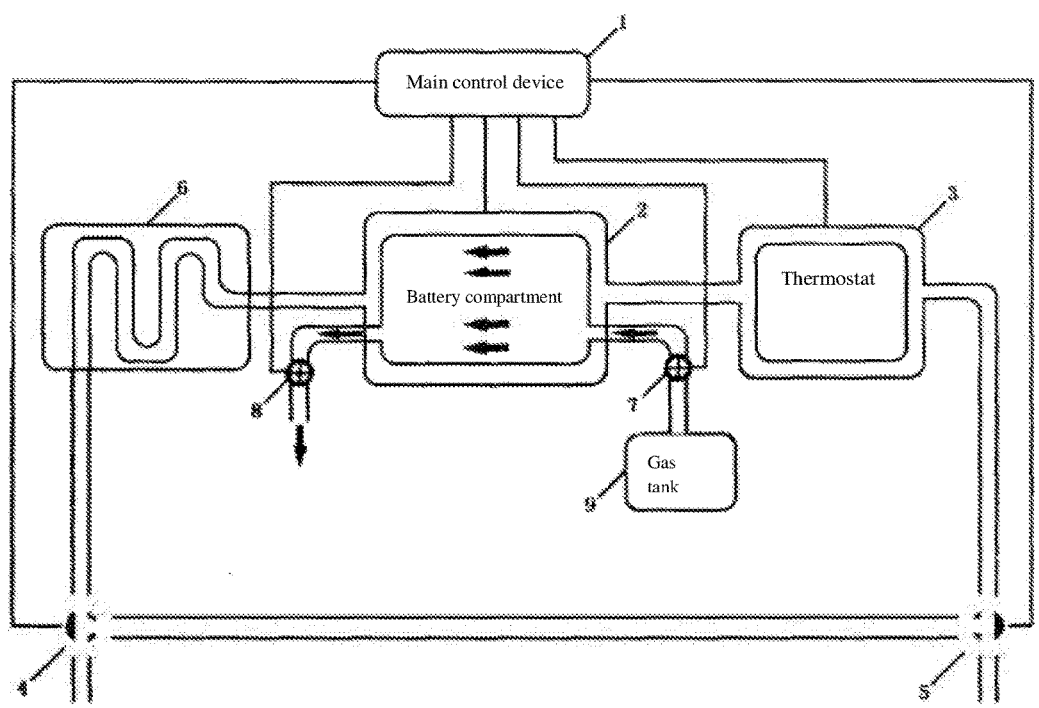

FIG. 9 is a schematic diagram of a battery management system for an electric automobile of a fifth embodiment of the present invention, which shows fire treatment of the battery management system during liquid circulation heating or liquid circulation refrigeration.

Figure 10:
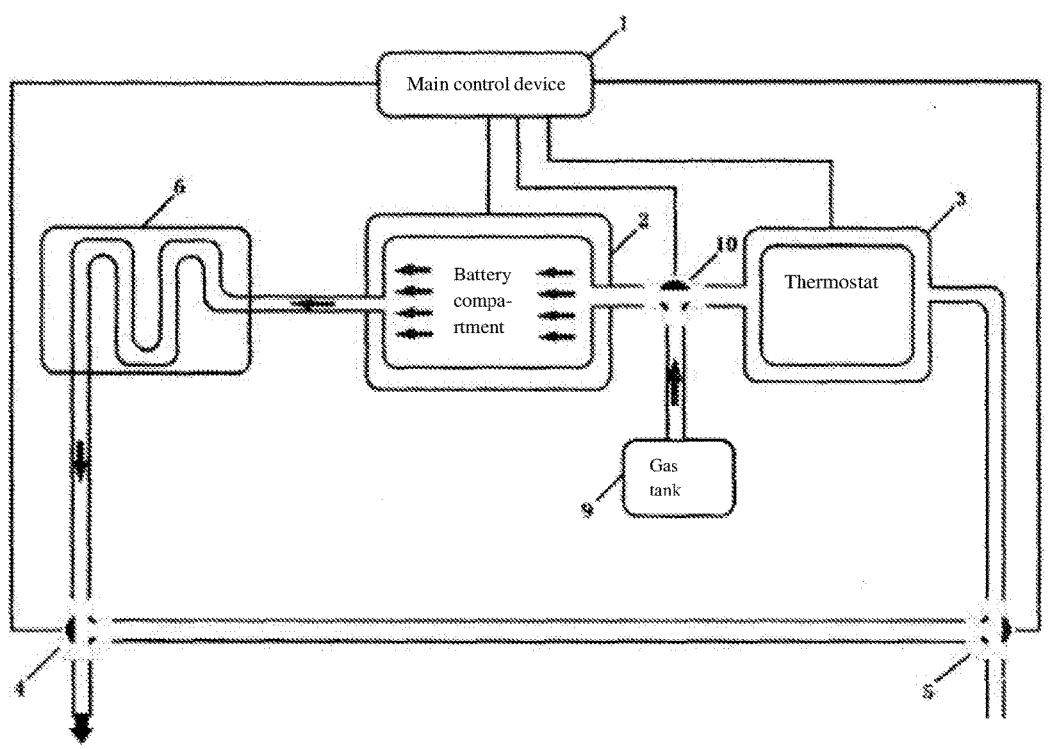

FIG. 10 is a schematic diagram of the battery management system for the electric automobile of the fifth embodiment of the present invention, which shows fire treatment of the battery management system during air circulation heating or air circulation refrigeration.

Figure 11:
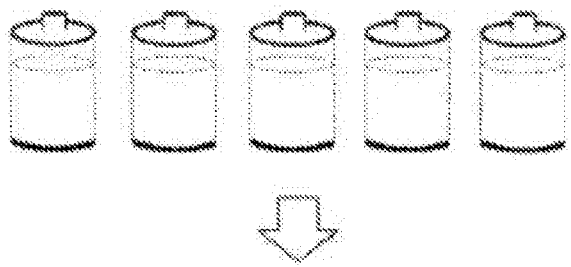
Figure 11:
Figure 11:
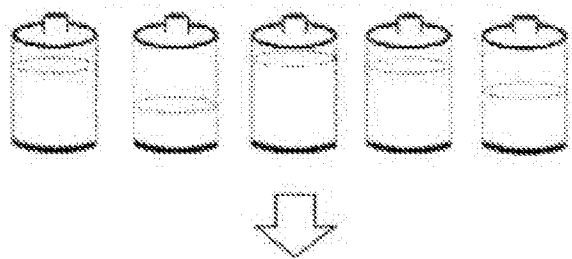
Figure 11:
Figure 11:
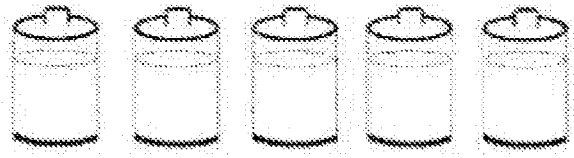

FIG. 11 is a schematic diagram of a battery management system for an electric automobile of a sixth embodiment of the present invention, which shows charge equalization of batteries.

Figure 12:
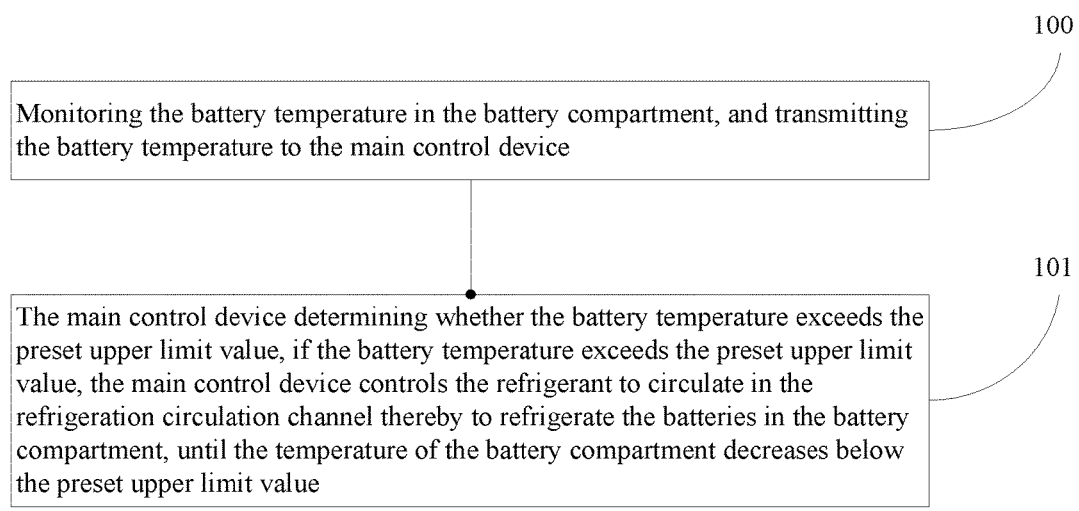

FIG. 12 is a flow chart of a control method of a battery management system for an electric automobile of a seventh embodiment of the present invention.

DETAILED DESCRIPTION OF THE INVENTION

Embodiments of the Invention

Embodiments of the Present Invention

To make the objective, technical solutions, and advantages of the present invention more clear, the technical solutions of embodiments of the present invention will be clearly and completely described with the combination of the accompanying drawings. Obviously, the described embodiments are part of the embodiments of the present invention, but not all embodiments. Elements and features described in a drawing or an embodiment of the present invention may be combined with elements and features illustrated in one or more other drawings or embodiments. It should be noted, for purposes of clarity, representation and description of components and processes unrelated to the present invention or known by those of ordinary skill in the art are omitted in the drawings and the description. Based on the embodiments of the present invention, all other embodiments obtained by those of ordinary skill in the absence of creative effort are within the scope of the present invention.

The First Embodiment:

Referring to FIG. 1, a block diagram of a battery management system for an electric automobile of a first embodiment of the present invention is shown. The battery management system for the electric automobile of the first embodiment may include a temperature monitoring device 10, a refrigeration circulation channel 11, and a main control device 12.

The temperature monitoring device 10 is connected to a battery compartment of the electric automobile, to monitor the battery temperature of the battery compartment and transmit the battery temperature to the main control device. Specifically, in the first embodiment, the temperature monitoring device 10 may be a temperature sensor real-time acquiring the temperature of the battery compartment. In a preferred embodiment of the present invention, the battery management system for the electric automobile further includes a current monitoring device and a voltage monitoring device, which specifically are a current sensor and a voltage sensor.

The refrigeration circulation channel 11 is connected to the battery compartment of the electric automobile, to circulate refrigerant to refrigerate the batteries in the battery compartment. It should be noted, referring to FIG. 2, a thermostat and three-way valves may be set in the refrigeration circulation channel.

The main control device 12 is connected to the acquisition device and the refrigeration circulation channel, respectively, to control the refrigerant to circulate in the refrigeration circulation channel thereby to refrigerate the batteries in the battery compartment when the battery temperature exceeds a preset upper limit value.

In a preferred embodiment of the present invention, the refrigerant includes cooling liquid. The refrigeration circulation channel 11 includes a first circulation channel to circulate the cooling liquid. A thermostat is set in the first circulation channel, to control the cooling liquid to circulate, and to adjust a temperature of the cooling liquid. The main control device 12 turns on the first circulation channel and powers on the thermostat to circulate the cooling liquid in the first circulation channel and adjust the temperature of the cooling liquid thereby refrigerating the batteries when the battery temperature exceeds the preset upper limit value, and powers off the thermostat when the battery temperature drops below the preset value. The cooling liquid may be cold water or other liquid having refrigeration effects, which is not limited in the embodiment. It should be noted, the specific processes of the main control device turning on the first circulation channel to refrigerate the batteries can refer to the contents described in FIG. 4 of a third embodiment.

In a preferred embodiment of the present invention, the refrigerant includes cold air. The refrigeration circulation channel includes a second circulation channel to circulate the cold air. A thermostat is set in the second circulation channel, to control the cold air to circulate, and to adjust a temperature of the cold air. The main control device turns on the second circulation channel and powers on the thermostat to circulate the cold air in the second circulation channel and adjust the temperature of the cold air thereby refrigerating the batteries when the battery temperature exceeds the preset upper limit value, and powers off the thermostat when the battery temperature drops below the preset value. It should be noted, the detailed processes of the main control device turning on the second circulation channel to refrigerate the batteries can refer to the contents described in FIGS. 5 and 6 of the third embodiment.

To better understand the battery management system for the electric automobile of the embodiment, the main control device 12 and the refrigeration circulation channel 11 connected to each other shown in FIG. 2 can be combined to understand the battery management system. Referring to FIG. 2, a thermostat 3, a first three-way valve 4, a second three-way valve 5, and an air conditioning component 6 are set in the refrigeration circulation channel 11.

The main control device 12 is connected to the battery compartment 2, the thermostat 3, the first three-way valve 4, and the second three-way valve 5, respectively. The battery compartment 2 is respectively connected to the thermostat 3 and a first valve port of the first three-way valve 4 through the refrigeration circulation channel 11. The thermostat 3 is connected to a third valve port of the second three-way valve 5 through the refrigeration circulation channel 11. A second valve port of the first three-way valve 4 is connected to a second valve port of the second three-way valve 5 through the refrigeration circulation channel 11.

It should be noted, the first circulation channel and the second circulation channel are circulation channels formed by the first three-way valve 4 and the second three-way valve 5 under different turning-on states, and the details are as follows:

When the third valve port and the second valve port of the second three-way valve 5 are turned on, and when the first valve port and the second valve port of the first three-way valve 4 are turned on, the formed circulation channel is the first circulation channel. At this time, a first valve port of the second three-way valve 5 is turned off and is isolated from the outside air, a third valve port of the first three-way valve 4 is turned off and is isolated from the outside air. The main control device 12, the battery compartment 2, the thermostat 3, the first three-way valve 4, the second three-way valve 5, and the air conditioning component 6 form a closed circulation path through the first circulation channel.

When the third valve port and the first valve port of the second three-way valve 5 are turned on, and when the first valve port and the third valve port of the first three-way valve 4 are turned on, the formed circulation channel is the second circulation channel. At this time, the first valve port of the second three-way valve 5 contacts with the outside air, and the third valve port of the first three-way valve 4 contacts with the outside air.

The battery management system for the electric automobile of the embodiment can monitor the battery temperature of the battery compartment through the temperature monitoring device 10, control the refrigerant to circulate in the refrigeration circulation channel 11 through the main control device 12 thereby to refrigerate the batteries in the battery compartment when the battery temperature exceeds the preset upper limit value. Because the battery management system for the electric automobile of the embodiment can timely refrigerate the batteries when the battery temperature exceeds the preset upper limit value and reduce the battery temperature, the battery management system reduces the impact of the high temperature on the service life, the capacity, and other properties of the batteries, thereby increasing the service life of the batteries.

The Second Embodiment:

Referring to FIG. 3, a block diagram of a battery management system for an electric automobile of a second embodiment of the present invention is shown. The battery management system for the electric automobile of the second embodiment may include a temperature monitoring device 10, a refrigeration circulation channel 11, a main control device 12, a heating circulation channel 13, a long-distance controller 14, a third circulation channel 15, a fourth circulation channel 16, and a gas tank valve controller 17.

It should be noted, the battery management system for the electric automobile includes the temperature monitoring device 10, the refrigeration circulation channel 11, the main control device 12, the heating circulation channel 13, the long-distance controller 14 and/or the third circulation channel 15, the fourth circulation channel 16, and the gas tank valve controller 17. The and/or includes the following three cases: (1) the battery management system including the temperature monitoring device 10, the refrigeration circulation channel 11, the main control device 12, the heating circulation channel 13, and the long-distance controller 14; (2) the battery management system including the temperature monitoring device 10, the refrigeration circulation channel 11, the main control device 12, the heating circulation channel 13 and the third circulation channel 15, the fourth circulation channel 16, and the gas tank valve controller 17; (3) the battery management system including the temperature monitoring device 10, the refrigeration circulation channel 11, the main control device 12, the heating circulation channel 13, the long-distance controller 14 and the third circulation channel 15, the fourth circulation channel 16, and the gas tank valve controller 17. In the second embodiment, the above-mentioned case (3) will be described as an example.

The temperature monitoring device 10 is connected to a battery compartment of the electric automobile, to monitor the battery temperature of the battery compartment and transmit the battery temperature to the main control device.

The refrigeration circulation channel 11 is connected to the battery compartment of the electric automobile, to circulate refrigerant to refrigerate the batteries in the battery compartment.

The main control device 12 is connected to the acquisition device and the refrigeration circulation channel, respectively, to control the refrigerant to circulate in the refrigeration circulation channel thereby to refrigerate the batteries in the battery compartment when the battery temperature exceeds a preset upper limit value.

The heating circulation channel 13 is connected to the battery compartment of the electric automobile and the main control device, respectively, to circulate heat medium thereby to heat the batteries in the battery compartment. The main control device 12 further controls the heat medium to circulate in the heating circulation channel 13 thereby to heat the batteries in the battery compartment when the battery temperature is below a preset lower limit value. It should be noted, the heating circulation channel 13 and the refrigeration circulation channel 11 can be set separately, or can also be set only one channel to achieve two functions of refrigerating and heating. The detailed processes of the main control device and the heating circulation channel heating the batteries can refer to the contents described in FIGS. 7 and 8 of a fourth embodiment.

The long-distance controller 14 is connected to the refrigeration circulation channel and/or the heating circulation channel, to receive long-distance control commands sent by users, and to control the refrigeration circulation channel or the heating circulation channel to refrigerate or heat the batteries according to the long-distance control commands.

It should be noted, the remote controller in the embodiment may be a phone controller, a remote controller, or a manual controller. The users can send commands to the phone controller through a phone, to achieve long-distance operation.

The third circulation channel 15 is connected to the battery compartment of the electric automobile. The fourth circulation channel 16 is connected to the battery compartment of the electric automobile. The gas tank valve controller 17 is connected to the main control device 12. The main control device 12 further controls the gas tank valve controller 17 to turn on the third circulation channel and the fourth circulation channel when the battery temperature reaches to the ignition point, thereby to discharge combustible gas from the battery compartment and spray flame-retardant gas into the battery compartment to process battery fire in the battery compartment. Details extinguishing processes may refer to contents described in FIGS. 9 and 10 of a fifth embodiment.

In a preferred embodiment of the present invention, the battery management system for the electric automobile further includes a power controller. The power controller is respectively connected to the main control device and the battery compartment, to receive the control commands sent by the main control device, and to adjust quantity of electricity of battery cells in the battery compartment according to the control commands. The batteries in the battery compartment are battery packs each including a plurality of battery cells. Details about the processes of equalizing power can be found in the contents shown in FIG. 11 of a sixth embodiment.

The Third Embodiment:

This embodiment will describe the battery management system for the electric automobile refrigerating the batteries.

FIG. 4 shows a schematic diagram of the battery management system of the third embodiment adopting a liquid circulation mode to refrigerate the batteries. A main control device 1 is respectively connected to a battery compartment 2, a thermostat 3, a first three-way valve 4, and a second three-way valve 5. The battery compartment 2 is connected to the thermostat 3 and a first valve port of the first three-way valve 4 through a circulation channel. The thermostat 3 is connected to a third valve port of the second three-way valve 5 through the circulation channel. A second valve port of the first three-way valve 4 is connected to a second valve port of the second three-way valve 5 through the circulation channel. In a preferred embodiment of the present invention, an air conditioning component 6 is connected between the battery compartment 2 and the first three-way valve 4.

When adopting the liquid circulation mode to refrigerate the batteries, the main control device 1 controls the first three-way valve 4 and the second three-way valve 5 to turn on the first circulation channel. Specifically, When the temperature monitoring device 10 of the battery management system for the electric automobile detects that the battery temperature is above the preset upper limit value, the main control device 1 controls the third valve port and the second valve port of the second three-way valve 5 to turn on, and controls the first valve port and the second valve port of the first three-way valve 4 to turn on. At this time, the refrigeration circulation channel forms the first circulation channel, as indicated by the arrow direction in FIG. 4. The main control device 1 powers on the thermostat 3 to perform the function of refrigeration circulation and adjust the temperature of the cooling liquid, thereby refrigerating the batteries. At this time, the first circulation channel is full of cooling liquid, and the cooling liquid may be cold water. The circulation of the cooling liquid can take the heat of the battery compartment away, to refrigerate the batteries compartment, thereby decreasing the temperature of the batteries in the battery compartment.

When the cooling liquid flows through a hollow shell of the battery compartment 2, the temperature of the battery compartment 2 decreases, and the temperature of the batteries in the battery compartment 2 then decreases. The main control device 1 simultaneously monitors the temperature of the batteries in the battery compartment 2 through the temperature monitoring device. When the battery temperature decreases to be less than the preset value, the main control device 1 powers off the thermostat, and the refrigeration processes end.

FIG. 5 is a schematic diagram of the battery management system of the third embodiment of the present invention which adopts an air circulation mode to refrigerate the batteries. The main control device 1 is respectively connected to the battery compartment 2, the thermostat 3, the first three-way valve 4, and the second three-way valve 5. The battery compartment 2 is connected to the thermostat 3 and a first valve port of the first three-way valve 4 through the circulation channel. The thermostat 3 is connected to a third valve port of the second three-way valve 5 through the circulation channel. The third valve port of the first three-way valve 4 is turned on to contact with the outside air. The first valve port of the second three-way valve 5 is turned on to contact with the outside air. The second valve ports of the first and second three-way valves 4 and 5 are turned off. In a preferred embodiment of the present invention, an air conditioning component 6 is connected between the battery compartment 2 and the first three-way valve 4.

When adopting the air circulation mode to refrigerate the batteries, the main control device 1 controls the first three-way valve 4 and the second three-way valve 5 to turn on the second circulation channel. Specifically, When the battery temperature is above the preset upper limit value, the main control device 1 controls the third valve port and the first valve port of the second three-way valve 5 to turn on, and controls the first valve port and the third valve port of the first three-way valve 4 to turn on. At this time, the refrigeration circulation channel forms the second circulation channel, as indicated by the arrow direction in FIG. 5. The main control device 1 powers on the thermostat 3 to perform the function of cold air circulation in the second circulation channel and adjust the temperature of the cold air, thereby refrigerating the batteries. Specifically, the main control device 2 starts the fan circulation of the thermostat to exhaust hot air of the battery compartment 2 through the third valve port of the first three-way valve 4, and pumps cold air into the hollow shell of the battery compartment through the first valve port of the second three-way valve 5 to refrigerate the batteries compartment 2. After the temperature of the battery compartment 2 decreases, the temperature of the batteries arranged in the battery compartment then decreases. The battery management system simultaneously monitors the temperature of the batteries in the battery compartment 2 through the temperature monitoring device. When the battery temperature decreases to be less than the preset value, the battery management system powers off the thermostat, and the refrigeration processes end.

FIG. 6 is a schematic diagram of the battery management system for the electric automobile of the third embodiment of the present invention, which uses another air circulation mode to refrigerate the batteries. When the battery temperature is above the preset upper limit value, the main control device 1 controls the first three-way vale 4 and the second three-way valve 5 to turn on the second circulation channel, starts the fan circulation of the thermostat to exhaust hot air of the battery compartment 2 through the third valve port of the first three-way valve 4, and pumps cold air into the battery compartment 2 through the first valve port of the second three-way valve 5 to refrigerate the batteries compartment 2. Because the outside cold air is directly pumped into the battery compartment, the outside cold air directly contacts with the batteries, thereby accelerating the refrigerating processes of the batteries.

The embodiment describes the battery management system refrigerating the batteries. In the embodiment, the main control device of the battery management system for the electric automobile can adopt the liquid circulation mode or the air circulation mode to refrigerate the batteries, wherein the air circulation mode provides two circulation modes, one of which is pumping the outside cold air into the hollow shell of the battery compartment, and the other of which is directly pumping the outside cold air into the battery compartment. The battery management system can automatically refrigerate the batteries when the battery temperature is above the preset upper limit value, and the above-mentioned refrigeration modes can both achieve better refrigerating effects.

The Fourth Embodiment:

This embodiment will describe the battery management system of the electric automobile heating the batteries.

FIG. 7 is a schematic diagram of a battery management system for an electric automobile of the fourth embodiment of the present invention, which uses a liquid circulation mode to heat batteries. A main control device 1 is respectively connected to a battery compartment 2, a thermostat 3, a first three-way valve 4, and a second three-way valve 5. The battery compartment 2 is connected to the thermostat 3 and a first valve port of the first three-way valve 4 through a circulation channel. The thermostat 3 is connected to a third valve port of the second three-way valve 5 through the circulation channel. A second valve port of the first three-way valve 4 is connected to a second valve port of the second three-way valve 5 through the circulation channel. In a preferred embodiment of the present invention, an air conditioning component 6 is connected between the battery compartment 2 and the first three-way valve 4. It should be noted, the thermostat 3 of the embodiment can be a heater.

When adopting the liquid circulation mode to heat the batteries, the main control device 1 controls the first three-way valve and the second three-way valve to turn on the first circulation channel. Specifically, when the battery temperature is less than the preset lower limit value, the main control device 1 controls the third valve port and the second valve port of the second three-way valve 5 to turn on, and controls the first valve port and the second valve port of the first three-way valve 4 to turn on, thereby forming the first circulation channel, as indicated by the arrow direction in FIG. 4. The main control device 1 ignites the thermostat 3 to start the liquid circulation mode of the thermostat thereby allowing the first circulation channel to be full of liquid. When the heated water flows through the hollow shell of the battery compartment, the battery compartment is heated, and the batteries arranged in the battery compartment is simultaneously heated. The battery management system simultaneously monitors the temperature of the batteries in the battery compartment 2 through the temperature monitoring device. When the battery temperature increases to the preset value, the battery management system powers off the thermostat, and the heating processes end.

FIG. 7 can also express the battery management system adopting the air circulation mode to heat the batteries. When adopting the air circulation mode to heat the batteries, the battery management system controls the first three-way valve and the second three-way valve to turn on the first circulation channel. When the battery temperature is less than the preset lower limit value, the main control device 1 ignites the thermostat to start the fan of the thermostat. When the heated water flows through the hollow shell of the battery compartment, the battery compartment is heated, and the batteries arranged in the battery compartment is simultaneously heated. The battery management system simultaneously monitors the temperature of the batteries in the battery compartment 2 through the temperature monitoring device. When the battery temperature increases to the preset value, the battery management system powers off the thermostat, and the heating processes end.

FIG. 8 is a schematic diagram of the battery management system for the electric automobile of the fourth embodiment of the present invention, which uses another air circulation mode to heat the batteries. A main control device 1 is respectively connected to a battery compartment 2, a thermostat 3, a first three-way valve 4, and a second three-way valve 5. The battery compartment 2 is connected to the thermostat 3 and a first valve port of the first three-way valve 4 through a circulation channel. The thermostat 3 is connected to a third valve port of the second three-way valve 5 through the circulation channel. A second valve port of the first three-way valve 4 is connected to a second valve port of the second three-way valve 5 through the circulation channel. In a preferred embodiment of the present invention, an air conditioning component 6 is connected between the battery compartment 2 and the first three-way valve 4.

When adopting the air circulation mode to heat the batteries, the thermostat selects an air heater. The air heater directly heats the air and then the hot air is blown into the battery compartment through the channel. A fuel tank supplies fuel needed by combustion of the thermostat. The main control device 1 controls the first three-way valve and the second three-way valve to turn on the first circulation channel. When the battery management system 1 detects that the battery temperature is less than the preset lower limit value, the thermostat is ignited and the fan of the thermostat is started. Hot air heated by the thermostat is directly blown into the battery compartment, to directly heat the battery compartment. The battery management system simultaneously monitors the temperature of the batteries in the battery compartment 2 through the temperature monitoring device. When the battery temperature increases to the preset value, the battery management system powers off the thermostat, and the heating processes end.

In a preferred embodiment of the present invention, an air conditioning component 6 is connected between the battery compartment 2 and the first three-way valve 4. When heating the batteries, and when the air temperature increasing to a preset value, air-conditioning fans are automatically started, to blow hot air into the automobile. Passengers can then enjoy a warm and comfortable environment after entering the electric automobile, without consuming outer energy to heat the air inside the automobile.

The embodiment describes the battery management system for the electric automobile heating the batteries. In the embodiment, the battery management system for the electric automobile can adopt a liquid circulation mode or an air circulation mode to heat the batteries, wherein the air circulation mode provides two circulation modes, one of which is blowing heated air into the hollow shell of the battery compartment, and the other of which is directly blowing the heated air into the battery compartment. The battery management system of the embodiment can automatically heat the batteries when the battery temperature is less than the preset lower limit value, and the above-mentioned heating modes can both achieve better heating effects.

The Fifth Embodiment:

This embodiment will describe extinguishing processes of the battery management system for the electric automobile.

When the battery management system adopts the fluid circulation mode or the air circulation mode to refrigerate or heat the batteries, to avoid the occurrence of battery fire imagine, the battery management system in the embodiment adds battery fire treatment.

FIG. 9 is a schematic diagram of a battery management system for an electric automobile of the fifth embodiment of the present invention, which shows fire treatment during liquid circulation heating or liquid circulation refrigeration. FIG. 9 adds a first flame-retardant gas tank valve 7, a second flame-retardant gas tank valve 8, and a flame-retardant gas tank 9 on the basis of FIG. 4. The first flame-retardant gas tank valve 7 is connected to the battery compartment 2 and the flame-retardant gas tank 9. The second flame-retardant gas tank valve 8 is connected to the battery compartment 2. The connection relationship of other components can refer to the description of FIG. 4 in the third embodiment, and this embodiment does not repeat them. The flame-retardant gas tank 9 is equipped with flame-retardant or inert gas, such as $CO_2$, $N_2$, etc.

When the battery management system 1 detects that the temperature of the battery compartment 2 reaches to the temperature of the ignition point, the battery management system 1 controls the first flame-retardant gas tank valve 7 to turn on the channel connecting the flame-retardant gas tank 9 and the battery compartment 2, and simultaneously controls the second flame-retardant gas tank valve 8 to turn on. At this time, the gas flow-direction of the whole system is shown by the arrow in FIG. 9. The flame-retardant or inert gas, such as $CO_2$, $N_2$, etc., is rapidly sprayed to the battery compartment 2 to fight the fire, and the flammable gas is exhausted out of the battery compartment 2 through the second flame-retardant gas tank valve 8.

FIG. 10 is a schematic diagram of the battery management system of the fifth embodiment of the present invention, which shows fire treatment during air circulation heating or air circulation refrigeration. FIG. 10 adds a flame-retardant gas tank 9 and a third three-way valve 10 on the basis of FIG. 4. The third three-way valve 10 is connected to the battery compartment 2, the thermostat 3, and the gas tank 9. The flame-retardant gas tank 9 is equipped with flame-retardant or inert gas, such as $CO_2$, $N_2$, etc.

When the battery management system 1 detects that the temperature of the battery compartment 2 reaches to the temperature of the ignition point, the battery management system 1 controls the third three-way valve 10 to turn on the channel connecting the flame-retardant gas tank 9 and the battery compartment 2, and simultaneously controls the first three-way valve 4 and the second three-way valve 5 to turn off the first circulation channel and turn on the second circulation channel. At this time, the (flame-retardant or inert) gas flow-direction of the whole system is shown by the arrow in FIG. 10. The flame-retardant or inert gas, such as $CO_2$, $N_2$, etc., is rapidly sprayed to the battery compartment to fight the fire, and the flammable gas is exhausted out of the battery compartment 2 through the third valve port of the first three-way valve 4.

The embodiment describes the extinguishing processes of the battery management system. In the embodiment, when the battery management system detects that the temperature of the battery compartment reaches to the temperature of the ignition point, that is when the batteries need to be extinguished, the whole circulation channel is in an open-loop state by controlling each three-way valve, which is more beneficial to allow the flame-retardant or inert gas, such as $CO_2$, $N_2$, etc., to enter the fired battery compartment, and simultaneously to prevent $O_2$ to enter the battery compartment, thereby being beneficial to exhaust fire.

The battery management system provided by the present invention has a function of managing the battery temperature, and simultaneously has a function of managing the battery crisis (exhausting fire for the batteries), which shares the gas channel, is simple in design, and has low cost.

The Sixth Embodiment:

This embodiment will describe processes of battery charge equalization of the battery management system for the electric automobile.

Commonly, the batteries in the battery compartment are battery packs each including a plurality of battery cells. After the batteries are used for a period of time, quantity of electricity of the battery cells in the battery compartment will change. In order to reduce or eliminate inconsistencies of the battery cells of the battery pack, the battery management system of the embodiment can automatically equalize and adjust the quantity of electricity for the battery cells of the same battery pack in a current range of 0-10 A. In equalizing, the energy of the batteries can hardly consumed, and the quantity of electricity is transferred between different battery cells. After the quantity of electricity of the batteries is equalized, the discharge ability of the batteries is effectively promoted, and simultaneously, the service life of the batteries can be prolonged. FIG. 11 is a schematic diagram of a battery management system of the sixth embodiment of the present invention, which shows charge equalization of batteries. The quantity of electricity of new battery cells of the same battery pack is substantially consistent. After a period of use, the quantity of electricity of the battery cells will generate difference. The quantity of electricity of the battery cells in the battery compartment can be automatically charge equalized through the battery management system provided by the embodiment, thereby recovering the quantity of electricity of the battery cells to be consistent.

It should be noted, the battery management system can achieve data acquisition with high-precision for the battery information, except achieving to adjust the battery temperature in the third and fourth embodiments, manage the battery crisis (exhausting fire for the batteries) in the fifth embodiment, and manage the battery charge equalization in the sixth embodiment. The battery management system can accurately acquire voltages and currents for the battery cells, the battery pack, and the batteries of the whole automobile. An error of the voltage acquisition is less than 3 mV, and an error of the current acquisition is less than 1%. The battery management system can also acquire the temperature of the batteries, and an error of the temperature is $\pm 1°$ C. The battery management system provided by the present invention can estimate a battery capacity. The current battery capacity can be estimated according to the information of the battery voltage, the battery current, and the battery temperature, etc. A relative error of the estimate of the battery capacity is less than 5%. The battery management system provided by the present invention can intelligently monitor the batteries and securely communicate. The battery management system can acquire real-time relative parameter information of the batteries, real-time control the equalization adjustment of the batteries, timing storage data and analyze battery performance, interactively communicate with a controller of the whole automobile through a high-speed CAN bus, have high anti-interference ability, insure real-time communication and stability of the system.

The battery management system provided by the present invention can real-time monitor and control various parameters of the power batteries of the electric automobile, provide battery information about current, voltage, temperature, remaining quantity of electricity, health status, etc. of the batteries, and equalize and adjust the quantity of electricity for the batteries with inconsistent power in a same battery pack. When the battery temperature is too great, the battery management system can refrigerate the batteries, and adjust the battery temperature to a top working condition. When the battery temperature is too low, the battery management system can heat the batteries to be increased to the top working condition. During heating, the quantity of electricity of the batteries will not be consumed. The battery management system provided by the present invention can achieve comprehensive management for the batteries, improve the ability of the batteries working safely, and increase the number of the batteries charge and discharge, thereby improving actual available capacity of the batteries and prolonging service life of the batteries.

The Seventh Embodiment:

FIG. 12 is a flow chart of a control method of a battery management system for an electric automobile of a seventh embodiment of the present invention. The embodiment includes the following steps:

Step 100, the temperature monitoring device monitors the battery temperature in the battery compartment, and transmits the battery temperature to the main control device;

Step 101, the main control device determines whether the battery temperature exceeds the preset upper limit value, if the battery temperature exceeds the preset upper limit value, the main control device controls the refrigerant to circulate in the refrigeration circulation channel to refrigerate the batteries in the battery compartment, until the temperature in the battery compartment decreases below the preset upper limit value.

In a preferred embodiment of the present invention, the refrigerant includes cooling liquid. The refrigeration circulation channel includes a first circulation channel to circulate the cooling liquid. A thermostat is set in the first circulation channel, to control the cooling liquid to circulate, and to adjust a temperature of the cooling liquid. The main control device turns on the first circulation channel and powers on the thermostat to circulate the cooling liquid in the first circulation channel and adjust the temperature of the cooling liquid thereby refrigerating the batteries when the battery temperature exceeds the preset upper limit value, and powers off the thermostat when the battery temperature decreases below the preset value.

In a preferred embodiment of the present invention, the refrigerant includes cold air. The refrigeration circulation channel includes a second circulation channel to circulate the cold air. A thermostat is set in the second circulation channel, to control the cold air to circulate, and to adjust a temperature of the cold air. The main control device turns on the second circulation channel and powers on the thermostat to circulate the cold air in the second circulation channel and adjust the temperature of the cold air thereby refrigerating the batteries when the main control device determines that the battery temperature exceeds the preset upper limit value, and powers off the thermostat when the battery temperature decreases below the preset value.

In a preferred embodiment of the present invention, the control method of the battery management system further includes: the main control device determines whether the battery temperature is below a preset lower limit value, if the battery temperature is below the preset lower limit value, the main control device controls heat medium to circulate in a heating circulation channel to heat the batteries in the battery compartment.

In a preferred embodiment of the present invention, the control method of the battery management system further includes: a remote controller receives a remote control command transmitted by a user, controls the refrigeration circulation channel or the heating circulation channel to refrigerate or heat the batteries according to the remote control command, and/or, the main control device determines whether the battery temperature reaches to the ignition point, if the battery temperature reaches to the ignition point, the main control device controls a gas tank valve controller to turn on a third circulation channel or a fourth circulation channel to exhaust flammable gas out of the battery compartment and spray flame-retardant gas into the battery compartment to extinguish the batteries in the battery compartment.

It should be noted, the control method of the battery management system of the embodiment is adapt to the battery management system of each of the first to sixth embodiments. The control method can timely refrigerate the batteries when the battery temperature exceeds the preset upper limit value, to reduce the battery temperature. Therefore, the impact of high temperature to the service life, capacity, etc. of the batteries can be reduced, and the service life of the batteries can be improved.

In the above-mentioned embodiments of the present invention, the sequence numbers and/or the order of the embodiments are only to facilitate the description, and do not mean the pluses and minuses of the embodiments. Descriptions of the embodiments are different emphases. Sections that are not detailed described in a certain embodiment can reference corresponding descriptions in other embodiments.

Those of ordinary skill in the art can understand that the all or a part of the steps of the above-mentioned method embodiment can be achieved through programs instructing related hardware. The above-mentioned programs can be stored in a computer readable storage medium. When the programs are executed, the steps including the above-mentioned embodiments are executed. The above-mentioned storage medium includes read-only memories (ROM), random access memories (RAM), disks, or optical disks, and other storage medium which can storage program codes.

In the embodiments of the system and the method of the present invention, apparently, the components and the steps can be decomposed, combined, and/or recombined after decomposition. The decomposition and/or recombination should be deemed to be equivalent solutions of the present invention. Simultaneously, in the above description about the embodiments of the present invention, descriptions and/or features about one of the embodiments can be used in one or more of the other embodiments in a same or similar way, combine with the features of the other embodiments, or replace the features of the other embodiments.

It should be emphasized, the terms of including or comprising in this article means the existence of the features, elements, steps, or modules, but does not exclude the existence or addition of one or more of other features, elements, steps, or modules.

Finally, it should be noted that although the present invention and its advantages have been described above in detail, it should be understood that any modifications, equivalent replacement and improvement made within the spirit and the scope of the present invention limited by the appended claims should be allowed. The scope of the present invention is not only limited to the embodiments of the processes, devices, means, methods, and steps described in the specification. Those of ordinary skill in the art will easily understand that the processes, devices, means, methods, or steps having functions or obtaining results substantially same with the corresponding embodiments and developed in present or in future can be executed according to the present invention. Therefore, the appended claims intend to include such processes, devices, means, methods, or steps within their scopes.

What is claimed is:

1. A battery management system for an electric automobile, comprising:
    a temperature monitoring device, connected to a battery compartment of the electric automobile and configured to monitor a battery temperature in the battery compartment and to transmit the battery temperature to a main control device;
    a refrigeration circulation channel, connected to the battery compartment of the electric automobile and configured to circulate a refrigerant so as to refrigerate batteries in the battery compartment;
    the main control device, connected to the temperature monitoring device and the refrigeration circulation channel and configured to control a circulation of the refrigerant in the refrigeration circulation channel so as to refrigerate the batteries in the battery compartment when the battery temperature exceeds a preset upper limit; and
    a thermostat, a first three-way valve, a second three-way valve, and an air conditioning component all set in the refrigeration circulation channel;
    wherein the main control device is connected to the battery compartment, the thermostat, the first three-way valve, and the second three-way valve; the thermostat and a first valve port of the first three-way valve are connected to the battery compartment through the refrigeration circulation channel, the thermostat is connected to a third valve port of the second three-way valve through the refrigeration circulation channel, a second valve port of the first three-way valve is connected to a second valve port of the second three-way valve through the refrigeration circulation channel.

2. The battery management system for the electric automobile of claim 1, wherein the refrigerant comprises cooling liquid,
    the refrigeration circulation channel comprises a first circulation channel configured to circulate the cooling liquid, the thermostat is disposed in the first circulation channel for controlling a circulation of the cooling liquid and adjusting a temperature of the cooling liquid, wherein the first circulation channel is formed when the third valve port and the second valve port of the second three-way valve are turned on, and when the first valve port and the second valve port of the first three-way valve are turned on, and
    the main control device opens the first circulation channel and tams on the thermostat to control the circulation of the cooling, liquid in the first circulation channel and to adjust the temperature of the cooling liquid so as to refrigerate the batteries when the battery temperature exceeds the preset upper limit, and turns off the thermostat when the battery temperature decreases to below the preset upper limit.

3. The battery management system for the electric automobile of claim 1, wherein the refrigerant comprises cold air,
    the refrigeration circulation channel comprises a second circulation channel configured to circulate the cold air, the thermostat is disposed in the second circulation channel for controlling a circulation of the cold air and adjusting a temperature of the cold air, wherein the second circulation channel is formed when the third valve port and a first valve port of the second three-way valve are turned on, and when the first valve port and a third valve port of the first three-way valve are turned on, and
    the main control device opens the second circulation channel and turns on the thermostat to control the circulation of the cold air in the second circulation channel and to adjust the temperature of the cold air so as to refrigerate the batteries when the battery temperature exceeds the preset upper limit, and turns off the thermostat when the battery temperature decreases to below the preset upper limit.

4. The battery management system for the electric automobile of claim 1, further comprising:
    a heating circulation channel, connected to the battery compartment of the electric automobile and the main control device and configured to circulate a hot medium so as to heat the batteries in the battery compartment,
    wherein the main control device controls a circulation of the hot medium in the heating circulation channel so as to heat the batteries in the battery compartment when the battery compartment is lower than a preset lower limit.

5. The battery management system for the electric automobile of claim 2, further comprising:
    a heating circulation channel, connected to the battery compartment of the electric automobile and the main control device and configured to circulate a hot medium so as to heat the batteries in the battery compartment,
    wherein the main control device controls a circulation of the hot medium in the heating circulation channel so as to heat the batteries in the battery compartment when the battery compartment is lower than a preset lower limit.

6. The battery management system for the electric automobile of claim 3, further comprising:
    a heating circulation channel, connected to the battery compartment of the electric automobile and the main control device and configured to circulate a hot medium so as to heat the batteries in the battery compartment,
    wherein the main control device controls a circulation of the hot medium in the heating circulation channel so as to heart the batteries in the battery compartment when the battery compartment is lower than a preset lower limit.

7. The battery management system for the electric automobile of claim 4, further comprising:
    a remote controller, connected to the refrigeration circulation channel and the heating circulation channel and configured to receive a remote control command and to control the refrigeration circulation channel or the heating circulation channel so as to refrigerate and heat the batteries according to the remote control command,
    a third circulation channel connected to the battery compartment of the electric automobile, a fourth circulation channel connected to the battery compartment of the electric automobile, and a gas tank valve controller connected to the main control device,
    wherein the main control device controls the gas tank valve controller to open the third circulation Channel or the fourth circulation channel so as to exhaust flammable gas out of the battery compartment and spray flame-retardant gas into the battery compartment to extinguish the batteries in the battery compartment when the battery temperature reaches an ignition point.

8. The battery management system for the electric automobile of claim 4, further comprising:
    a remote controller, connected to the refrigeration circulation channel and the heating circulation channel and configured to receive a remote control command and to control the refrigeration circulation channel or the heating circulation channel so as to refrigerate or heat the batteries according to the remote control command, a third circulation channel connected to the battery compartment of the electric automobile, a fourth circulation channel connected to the battery compartment of the electric automobile, and a gas tank valve controller connected to the main control device, wherein the main control device controls the gas tank valve controller to open the third circulation channel or the fourth circulation channel so as to exhaust flammable gas out of the battery compartment and spray flame-retardant gas into the battery compartment to extinguish the batteries in the battery compartment when the battery temperature reaches an ignition point.

9. The battery management system for the electric automobile of claim 4, further comprising:

a remote controller, connected to the refrigeration circulation channel and the heating circulation channel and configured to receive a remote control command and to control the refrigeration circulation channel and the heating circulation channel so as to refrigerate and heat the batteries according to the remote control command.

10. The battery management system for the electric automobile of claim 4, further comprising:

a remote controller, connected to the refrigeration circulation channel or the heating circulation channel and configured to receive a remote control command and to control the refrigeration circulation channel or the heating circulation channel so as to refrigerate or heat the batteries according to the remote control command.

11. The battery management system for the electric automobile of claim 4, further comprising:

a third circulation channel connected to the battery compartment of the electric automobile, a fourth circulation channel connected to the battery compartment of the electric automobile, and a gas tank valve controller connected to the main control device, wherein the main control device controls the gas tank valve controller to open the third circulation channel or the fourth circulation channel so as to exhaust flammable gas out of the battery compartment and spray flame-retardant gas into the battery compartment to extinguish the batteries in the battery compartment when the battery temperature reaches an ignition point.

12. A control method of the battery management system for the electric automobile of claim 1, comprising the steps of:

monitoring a battery temperature in a battery compartment, and transmitting the battery temperature to a main control device; and the main control device determining whether the battery temperature exceeds a preset upper limit, if the battery temperature exceeds the preset upper limit, controlling a circulation of a refrigerant to circulate in a refrigeration circulation channel so as to refrigerate the batteries in the battery compartment until the temperature of the battery compartment decreases to below the preset upper limit.

13. The control method of the battery management system for the electric automobile of claim 12, wherein the refrigerant comprises a cooling liquid, the refrigeration circulation channel comprises a first circulation channel configured to circulate the cooling liquid, a thermostat is disposed in the first circulation channel for controlling a circulation of the cooling liquid and adjusting the temperature of the cooling liquid, and the main control device opens the first circulation channel and turns on the thermostat to control the circulation of the cooling liquid in the first circulation channel and to adjust the temperature of the cooling liquid so as to refrigerate the batteries when the main control device determines that the battery temperature exceeding the preset upper limit, and turns off the thermostat when the battery temperature decreases to below the preset upper limit.

14. The control method of the battery management system for the electric automobile of claim 12, wherein the refrigerant comprises cold air, the refrigeration circulation channel comprising a second circulation channel configured to circulate the cold air, a thermostat is disposed in the second circulation channel for controlling a circulation of the cold air and adjusting a temperature of the cold air, and the main control device opens the second circulation channel and turns on the thermostat to control the circulation of the cold air in the second circulation channel and to adjust the temperature of the cold air so as to refrigerate the batteries when the main control device determines that the battery temperature exceeds the preset upper limit, and turns off the thermostat when the battery temperature decreases to below the preset upper limit.

15. The control method of the battery management system for the electric automobile of claim 12, further comprising the steps of:

the main control device determining whether the battery temperature is lower than a preset lower limit and, if the battery temperature is lower than the preset lower limit, controlling a hot medium to circulate in a heating circulation channel to heat the batteries in the battery compartment.

16. The control method of the battery management system for the electric automobile of claim 15, further comprising the steps of:

a remote controller receiving a remote control command and controlling the refrigeration circulation channel or the heating circulation channel to refrigerate or heat the batteries according to the remote control command; and the main control device determining whether the battery temperature reaches an ignition point and, if the battery temperature reaches the ignition point, controlling a gas tank valve controller to open a third circulation channel connected to the battery compartment or a fourth circulation channel connected to the battery compartment so as to exhaust flammable gas out of the battery compartment and spray flame-retardant gas into the battery compartment to extinguish the batteries in the battery compartment.

17. The control method of the battery management system for the electric automobile of claim 15, further comprising the steps of:

a remote controller receiving a remote control command and controlling the refrigeration circulation channel or the heating circulation channel to refrigerate or heat the batteries according to the remote control command; or the main control device determining whether the battery temperature reaches an ignition point and, if the battery temperature reaches the ignition point, controlling a gas tank valve controller to open a third circulation channel connected to the battery compartment or a fourth circulation channel connected to the battery compartment so as to exhaust flammable gas oat of the battery compartment and spray flame-retardant gas into the battery compartment to extinguish the batteries in the battery compartment.

* * * * *